(12) United States Patent
Lee et al.

(10) Patent No.: US 12,140,957 B2
(45) Date of Patent: Nov. 12, 2024

(54) SYSTEM FOR SENSING AND RESPONDING TO A LATERAL BLIND SPOT OF A MOBILE CARRIER AND METHOD THEREOF

(71) Applicant: METAL INDUSTRIES RESEARCH & DEVELOPMENT CENTRE, Kaohsiung (TW)

(72) Inventors: Tsung-Han Lee, Kaohsiung (TW); Jinn-Feng Jiang, Kaohsiung (TW); Shih-Chun Hsu, Kaohsiung (TW); Tsu-Kun Chang, Kaohsiung (TW); Cheng-Tai Lei, Kaohsiung (TW); Hung-Yuan Wei, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 225 days.

(21) Appl. No.: 17/896,810

(22) Filed: Aug. 26, 2022

(65) Prior Publication Data

US 2023/0161350 A1 May 25, 2023

(30) Foreign Application Priority Data

Nov. 25, 2021 (TW) .................................. 110144028

(51) Int. Cl.
*G05D 1/00* (2024.01)
*B60W 30/06* (2006.01)

(52) U.S. Cl.
CPC .......... *G05D 1/0214* (2013.01); *B60W 30/06* (2013.01); *G05D 1/024* (2013.01); *G05D 1/0253* (2013.01);

(Continued)

(58) Field of Classification Search
CPC .... G05D 1/0214; G05D 1/024; G05D 1/0253; G05D 1/0257; B60W 30/06
See application file for complete search history.

(56) References Cited

U.S. PATENT DOCUMENTS

2018/0345955 A1* 12/2018 Kim ................... B62D 15/0285
2021/0263519 A1*  8/2021 Ogino ............. B60W 60/00272
2021/0300349 A1*  9/2021 Hara ..................... B60W 50/14

FOREIGN PATENT DOCUMENTS

JP         2012232608 A      11/2012
JP         2014054912 A       3/2014
(Continued)

OTHER PUBLICATIONS

Office Action mailed to Corresponding Patent Application No. 2022-164434 on Sep. 5, 2023.

*Primary Examiner* — Peter D Nolan
*Assistant Examiner* — Luke Huynh
(74) *Attorney, Agent, or Firm* — WPAT, P.C.

(57) ABSTRACT

The present application is to provide a system for sensing and responding to a lateral blind spot of a mobile carrier and method thereof, which is applied for a mobile carrier during moving to a parking place. Firstly, a light scan unit and a depth image capture unit are used to scan a plurality of surrounding objects and capture a plurality of object depth images of the surrounding objects, and then a plurality of screened images are obtained according to a moving route of the mobile carrier for further obtaining correspondingly a plurality of forecasted lines to generate corresponded notice message for noting driver or ADAS. Due to the objects corresponding to the screened images and located on a blind position which is at one side of the mobile carrier, the notice message provides the driver preventing from the ignored danger by ignoring the blind position.

8 Claims, 10 Drawing Sheets

(52) U.S. Cl.
CPC ..... *G05D 1/0257* (2013.01); *B60W 2420/408* (2024.01)

(56) References Cited

FOREIGN PATENT DOCUMENTS

| | | |
|---|---|---|
| WO | 2013046408 A1 | 4/2013 |
| WO | 2018158911 A1 | 9/2018 |

\* cited by examiner

SYSTEM FOR SENSING AND RESPONDING TO A LATERAL BLIND SPOT OF A MOBILE CARRIER AND METHOD THEREOF

FIELD OF THE INVENTION

The present application relates generally to a warning sensor fusion system and the method thereof, and particularly to a mobile carrier warning sensor fusion system and the method thereof.

BACKGROUND OF THE INVENTION

Traditional advanced driver assistance systems (ADAS) are developed to assist drivers and can be divided into three main parts: automotive sensors, automotive processors, and actuators. ADAS sense signals outside carriers using automotive sensors such as millimeter-wave radars, lidar, thermal sensors, and pressure sensors. The sensing data from automotive sensors are transmitted to automotive processors, for example, electronic control units (ECU), for producing warning information for drivers according to the sensing data and thus avoiding dangerous road conditions. Furthermore, automotive sensors can even intervene the drivers' driving operations directly and activating actuators for slowing, emergency braking, or turning cars and protecting drivers.

In addition, to protect drivers, radar detection technologies are developed to detect carrier surroundings. Unfortunately, radars cannot differentiate fixed or mobile objects surrounding a carrier. When an object not influencing the movement of the carrier approaches, radars still drive the warning unit to submit warning messages, inducing additional bother to drivers. Although the detection for surrounding obstacles of a carrier has been improved, in the moving process of the carrier, there still exists danger caused by other carriers. Moreover, there are more objects that can influence driving safety. For example, pedestrians, animals, and moving objects can be regarded as the obstacles for moving carriers. They will cause emergency situations in the moving process. The influence is worst in the crowded streets of cities.

Dash cams are developed to record color images under emergency situations for judgements afterwards. Unfortunately, they do not solve the root problem. To solve the problem, drivers should be able to prevent emergency situations. Current dash cams are disposed on the front and rear sides of a carrier. There still exist blind spots on both sides. It is required to have image equipment integrated with detection technologies for both sides for further assisting drivers to prevent blind spots. In addition, according to the detection for the lateral blind spots, dangers can be predicted and drivers can be notified for protecting them.

Dangerous situations of carriers will not occur only at crossroads. They will happen even in parking, especially when auto parking technologies are widely applied. ADAS alone is not sufficient to protect drivers. The prediction of dangers is also required.

Accordingly, the present application provides a system for sensing and responding to a lateral blind spot of a mobile carrier and the method thereof. By scanning the objects on one side of a mobile carrier, the corresponding object image will be given. Then the images are filtered to give filtered images that indicate influence on the carrier. According to the corresponding objects in the filtered images, the paths of the objects will be predicted. By modifying the moving route, the dangerous situations can be avoided.

SUMMARY

An objective of the present application is to provide a system for sensing and responding to a lateral blind spot of a mobile carrier and the method thereof. By scanning the objects on one side of a carrier, the corresponding object image will be given. Then the images are filtered to give filtered images corresponding to the lateral blind spot of the mobile carrier. According to the corresponding objects in the filtered images, the paths of the objects will be predicted. By modifying the moving route, the dangerous situations can be avoided.

To achieve the above objective, the present application discloses a method for sensing and responding to a lateral blind spot of a mobile carrier. The mobile carrier includes a host connected to a light scanning unit and an image extraction unit. The host executes the steps of the method. First, the host executes a parking command corresponding to the mobile carrier for enabling the mobile carrier to park to the corresponding parking space. The host generates a positioning message according to the relative location or absolute location of the mobile carrier with respect to the parking space. Next, the host generates a first moving route according to the positioning message and the parking space. The light scanning unit scans one or more objects at the parking space according to the first moving route. The image extraction unit extracts one or more object images correspondingly. Then, the host adopts an image optical flow method to classify the one or more object images and giving the corresponding one or more filtered images of the parking space. Afterwards, the host generates one or more predicted routes according to the corresponding object vector of the one or more filtered images. Namely, the host predicts the path of the corresponding object of the one or more filtered images. Next, the host modifies the first moving route according to the one or more predicted routes and generates a second moving route correspondingly. In other words, the host performs danger prediction on the blond spots of the mobile carrier and adjusts the corresponding moving route of the mobile carrier. Accordingly, the present application can provide danger prediction on lateral blind spots of a mobile carrier in the parking process and generates the corresponding modified moving route. Then the driving assistance system can intervene driving control according to the notification message and notifies the driver concurrently.

According to an embodiment of the present application, in the steps in which the light scanning unit scans one or more objects at the parking space according to the first moving route and the image extraction unit extracts one or more object images correspondingly, the light scanning unit further scans the one or more objects surrounding the parking space and the image extraction unit extracts the corresponding one or more object images surrounding the parking space.

According to an embodiment of the present application, in the steps in which the host adopts an image optical flow method to classify the one or more object images, the host extracts a plurality of three-dimensional images according to the one or more filtered images and classifies the one or more object images using the image optical flow method according to the positioning message.

According to an embodiment of the present application, in the step in which the host modifies the first moving route according to the one or more predicted routes and generates a second moving route correspondingly, the host judges if a first effective area of the parking space is shrunk to a second effective area according to the one or more predicted routes. The first effective area is greater than a carrier size of the mobile carrier. The second effective area is smaller than the carrier size. When the first effective area is shrunk to the second effective area, the second moving route guides the mobile carrier to park to a portion of the parking space.

According to an embodiment of the present application, in the step in which the host modifies the first moving route according to the one or more predicted routes and generates a second moving route correspondingly, the host calculates according to a corresponding radius difference between inner wheels and a turning angle of the first moving route and the one or more predicted routes and then modifies the first moving route and generates the second moving route correspondingly.

The present application further provides a system for sensing and responding to a lateral blind spot of a mobile carrier and the mobile carrier may set a host, a positioning unit, a light scanning unit, and an image extraction unit. The host is disposed in the mobile carrier. The light scanning unit and the image extraction unit are disposed on one side of the mobile carrier. The host executes a parking command corresponding to the mobile carrier for enabling the mobile carrier to park to the corresponding parking space. The host generates a positioning message according to the relative location or absolute location of the mobile carrier with respect to the parking space. Next, the host generates a first moving route according to the positioning message and the parking space. The light scanning unit scans one or more objects at the parking space according to the first moving route. The image extraction unit extracts one or more object images correspondingly. Then, the host adopts an image optical flow method to classify the one or more object images and giving the corresponding one or more filtered images of the parking space. Afterwards, the host generates one or more predicted routes according to the corresponding object vector of the one or more filtered images. Namely, the host predicts the path of the corresponding object of the one or more filtered images. Next, the host modifies the first moving route according to the one or more predicted routes and generates a second moving route. In other words, the host performs danger prediction on the blond spots of the mobile carrier and adjusts the corresponding moving route of the mobile carrier. Accordingly, the present application can provide danger prediction on lateral blind spots of a mobile carrier in the parking process and generates the corresponding modified moving route. Then the driving assistance system can intervene driving control according to the notification message and notifies the driver concurrently.

According to an embodiment of the present application, the light scanning unit is a lidar or a radar scanner.

According to an embodiment of the present application, the light scanning unit further scans the one or more objects surrounding the parking space and the image extraction unit extracts the one or more object images surrounding the parking space.

According to an embodiment of the present application, the host judges if a first effective area of the parking space is shrunk to a second effective area according to the one or more predicted routes. The first effective area is greater than a carrier size of the mobile carrier. The second effective area is smaller than the carrier size. When the first effective area is shrunk to the second effective area, the second moving route guides the mobile carrier to park to a portion of the parking space.

According to an embodiment of the present application, the host calculates according to a corresponding radius difference between inner wheels and a turning angle of the first moving route and the one or more predicted routes and then modifies the first moving route and generates the second moving route correspondingly.

According to an embodiment of the present application, the location of the lateral blind spot is a blind spot region corresponding to the parking space of the mobile carrier and defined by the intelligent transport system ISO 17387.

DETAILED DESCRIPTION

Since the radar system according to the prior art and dash cams cannot provide prediction of lateral blind spots of a mobile carrier, the present application provides a system for sensing and responding to a lateral blind spot of a mobile carrier and the method thereof for avoiding the dangerous situations caused by later blind spots of a mobile carrier.

In the following, the properties and the accompanying system of the mobile carrier warning sensor fusion system and the method thereof according to the present application will be further illustrated.

Figure 1:
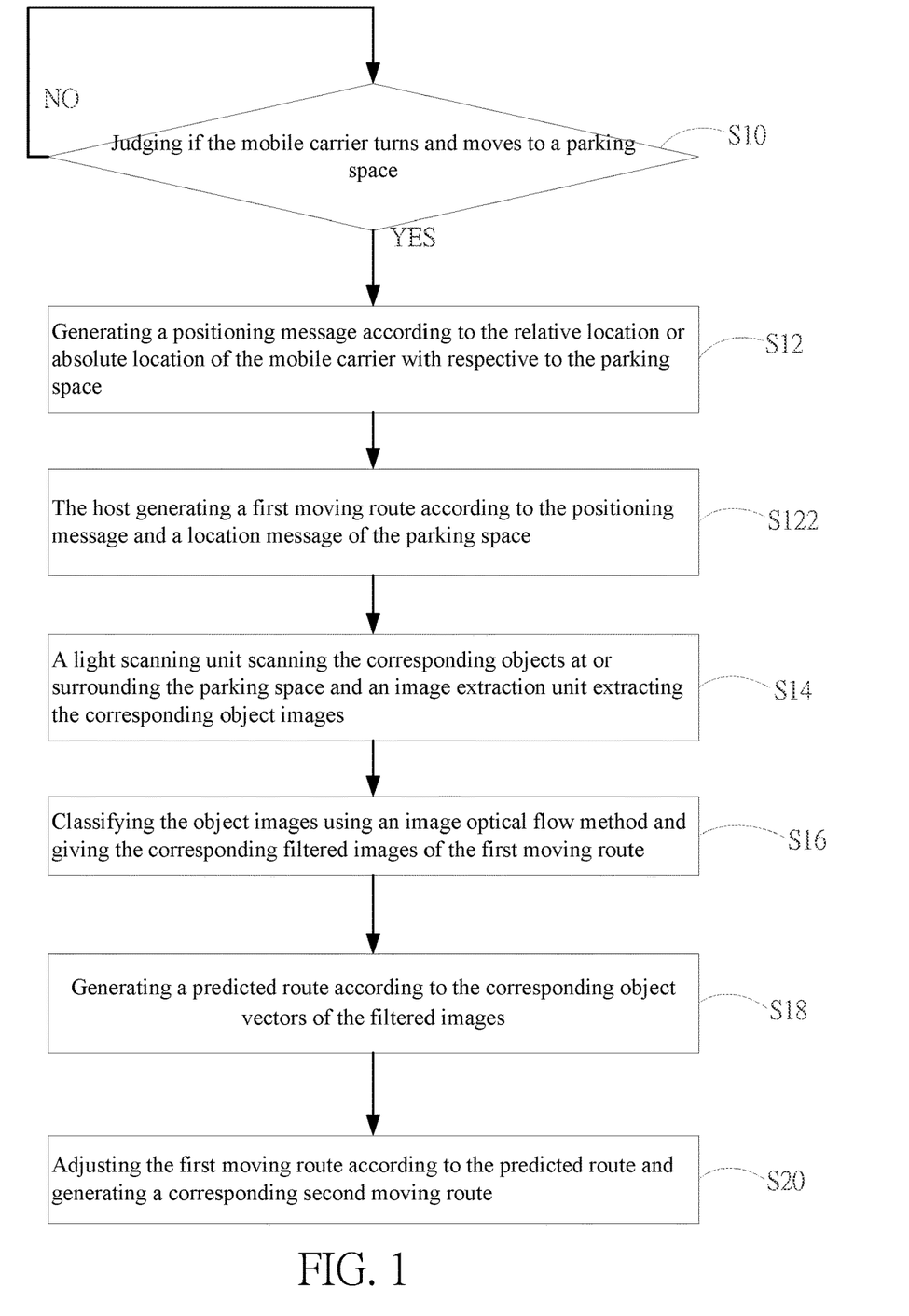
FIG. 1 shows a flowchart according to an embodiment of the present application.

First, please refer to FIG. 1, which shows a flowchart according to an embodiment of the present application. As shown in the figure, according to the method for sensing and responding to a lateral blind spot of a mobile carrier of the present application, the host should execute the following steps:

Step S10: Judging if the mobile carrier turns and moves to a parking space;

Step S12: Generating a positioning message according to the relative location or absolute location of the mobile carrier with respective to the parking space;

Step S122: The host generating a first moving route according to the positioning message and a location message of the parking space;

Step S14: A light scanning unit scanning the corresponding objects at or surrounding the parking space and an image extraction unit extracting the corresponding object images;

Step S16: Classifying the object images using an image optical flow method and giving the corresponding filtered images of the first moving route;

Step S18: Generating a predicted route according to the corresponding object vectors of the filtered images; and Step S20: Adjusting the first moving route according to the predicted route and generating a corresponding second moving route.

Please refer to FIG. 2A to FIG. 2E, which illustrate the accompanying identification system 1 for the method for sensing and responding to a lateral blind spot of a mobile carrier according to the present application. The system 1 comprises a host 10, a light scanning unit 20, and an image extraction unit 30. The host 10 according to the present embodiment is an automotive computer that includes a processing unit 12 and a memory 14. Nonetheless, the present application is not limited to the embodiment. The host 10 according to the present application can be a server, a notebook computer, a tablet computer, or any electronic device with image processing capability. The light scanning unit 20 according to the present embodiment is a lidar or a laser scanner. The image extraction unit 30 according to the present embodiment is a color image extraction unit, for example, an automotive CMOS image sensor. The host 10 uses the processing unit 12 to execute an operational program P for receiving the image data IMG generated by the image extraction unit 30 and performing image processing. The host 10 is disposed in a mobile carrier V. The light scanning unit 20 and image extraction unit 30 are disposed on one side of the mobile carrier V. The host 10 is connected electrically to the light scanning unit 20 and the image extraction unit 30. An image extraction angle of the image extraction unit 30 according to the present embodiment is between 120 and 170 degrees and extracts object images with 10 meters. Besides, the host 10 is further connected electrically to a positioning unit 40.

Figure 2A:
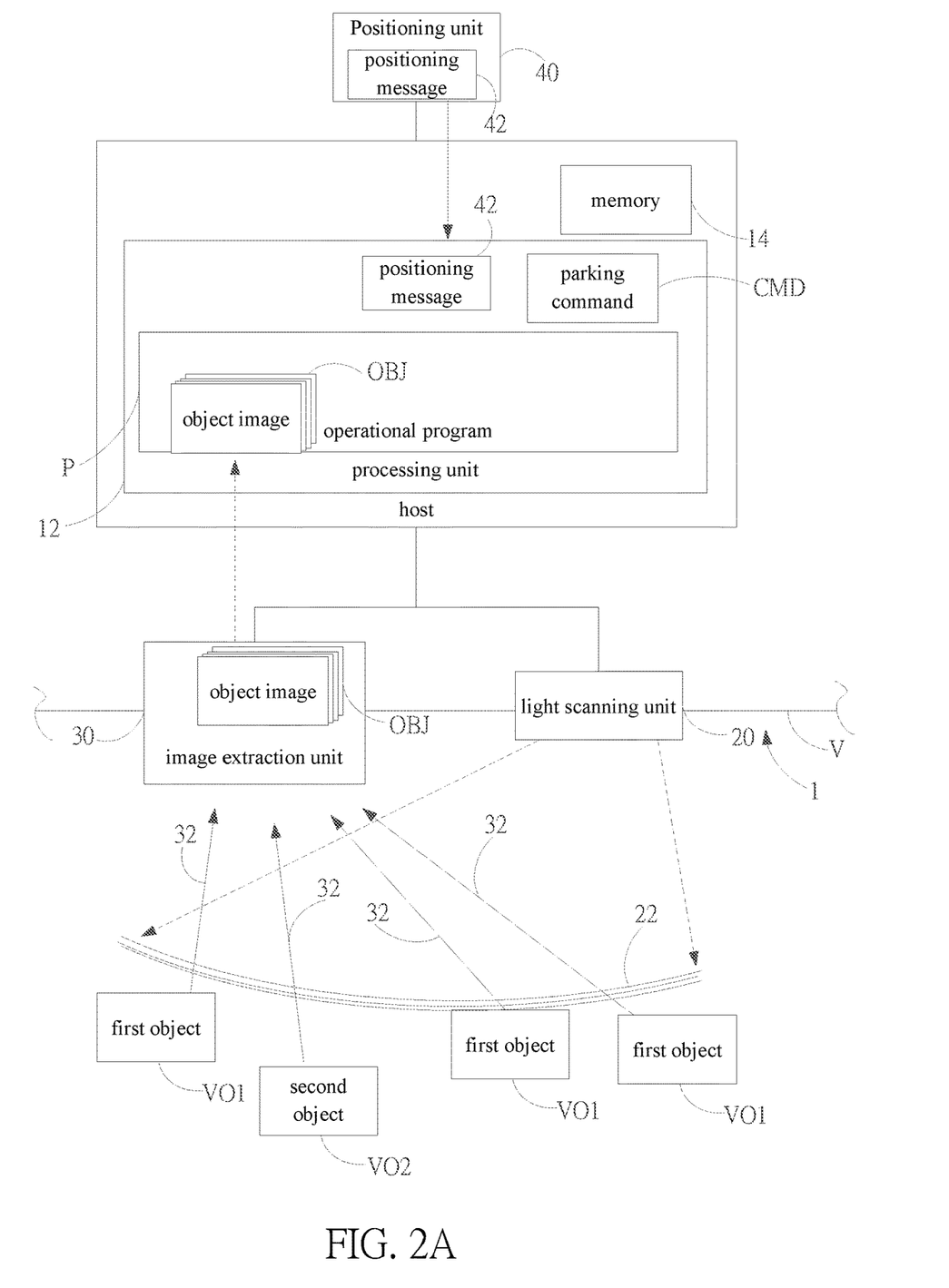
FIG. 2A to FIG. 2F show schematic diagrams of partial steps according to an embodiment of the present application.

In the step S10, as shown in FIG. 2A, the host 10 judges if a parking command CMD is executed. In other words, the host judges the mobile carrier V turns and heads for a parking space 50. If not, the host 10 continue to judge if there is a parking command by re-executing the step S10. When there is a parking command CMD, the step S12 is executed. Please refer to FIG. 2A and FIG. 2B. According to the present embodiment, a positioning message 42 generated by the positioning unit 40 is transmitted to the processing unit 12 of the host 10. The positioning unit 40 generates the positioning message 42 to the processing unit 12 according to the absolute location of the mobile carrier V and the parking space 50. Then the processing unit 12 generates a corresponding first moving route L1 of the mobile carrier V according to the positioning message 42 and the parking space 50 in the step S122. For example, the first moving route L1 is the mobile carrier V turns and heads for the parking space 50. The first moving route L1 is a predetermined route for the mobile carrier V to move to the parking space 50. Thereby, according to the present embodiment, the step S14 will be executed subsequently. In addition to using the positioning unit 40 to provide the positioning message 42 of absolute location, the light scanning unit 20 can perform optical scanning on one side of the mobile carrier V or even 10 to 50 meters surrounding the mobile carrier V for providing the positioning message 42 of relative location. In other words, the light scanning unit 20 acquires the positioning result for the space surrounding the mobile carrier V and hence providing the positioning message 42 corresponding to the parking space 50 with respect to the mobile carrier V.

The host 10 executes the step S14. Please refer again to FIG. 2A and FIG. 2B. The host 10 uses the light scanning unit 20 to perform optical scanning on one side of the mobile carrier V, especially on the parking space 50, according to the first moving route L1. It also scans the surroundings of the parking space 50. Namely, the light scanning unit 20 scans the objects corresponding to the parking space 50. The scanning method of the light scanning unit 20 is to generate one or more optical gratings 22 to one or more objects. According to the present embodiment, the objects includes a first object VO1 and a second object VO2, which will produce reflection light 32 according to the optical grating 22 to the image extraction unit 30 and hence producing a plurality of object images OBJ correspondingly. According to the present embodiment, the light scanning unit 20 is a lidar. A plurality of parallel stripes of light, particularly, vertical laser light, form the optical grating 22. The image extraction unit 30 extracts the corresponding reflection light 32 of the optical grating 22 and generates the corresponding object images OBJ of the reflection light 32. In addition, the light scanning unit 20 according to the present application can further be a laser scanner which achieves the effect of a lidar by a plurality of laser scans. The processing unit 12 executes the operational program P for processing the object images OBJ extracted by the image extraction unit 30 and hence highlighting the object images OBJ corresponding to the first object VO1 and the second object VO2, as well as performing image stitching or color and greyscale calibration on the object images OBJ for subsequent spatial identification.

The location of the lateral blind spot is a blind spot region corresponding to the parking space of the mobile carrier V and defined by the intelligent transport system ISO 17387. For the first object VO1 or the second object VO2 in the blind spots, the light scanning unit 20 and the image extraction unit 30 can assist to extract the unaware places. In addition, the ADAS also needs a more complete image extraction for identifying lateral objects, such as pedestrians, cars, bus stops, traffic labels, or traffic lights, or even the A-pillars, which are the visual direction that always induces blind spots.

Figure 2B:
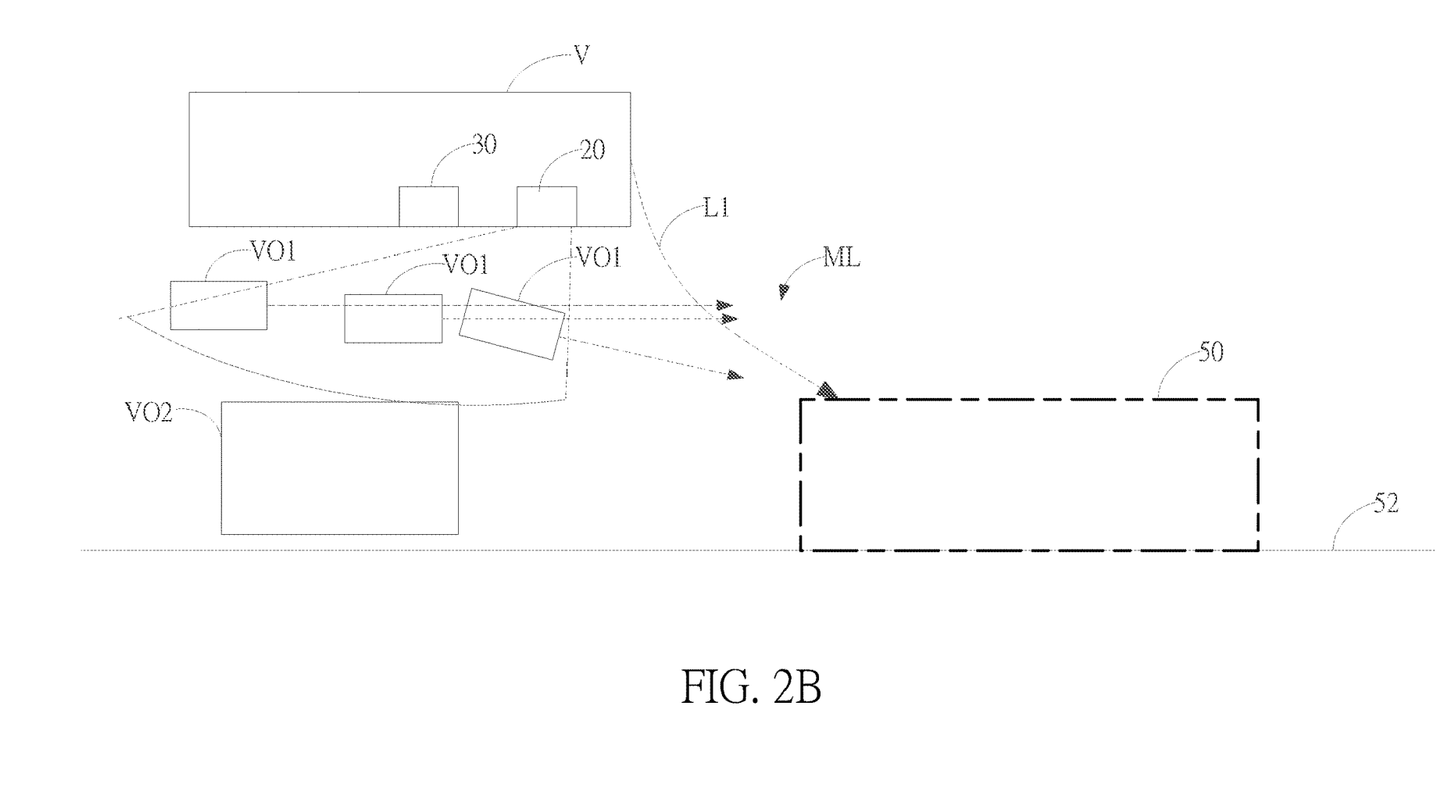
Figure 2C:
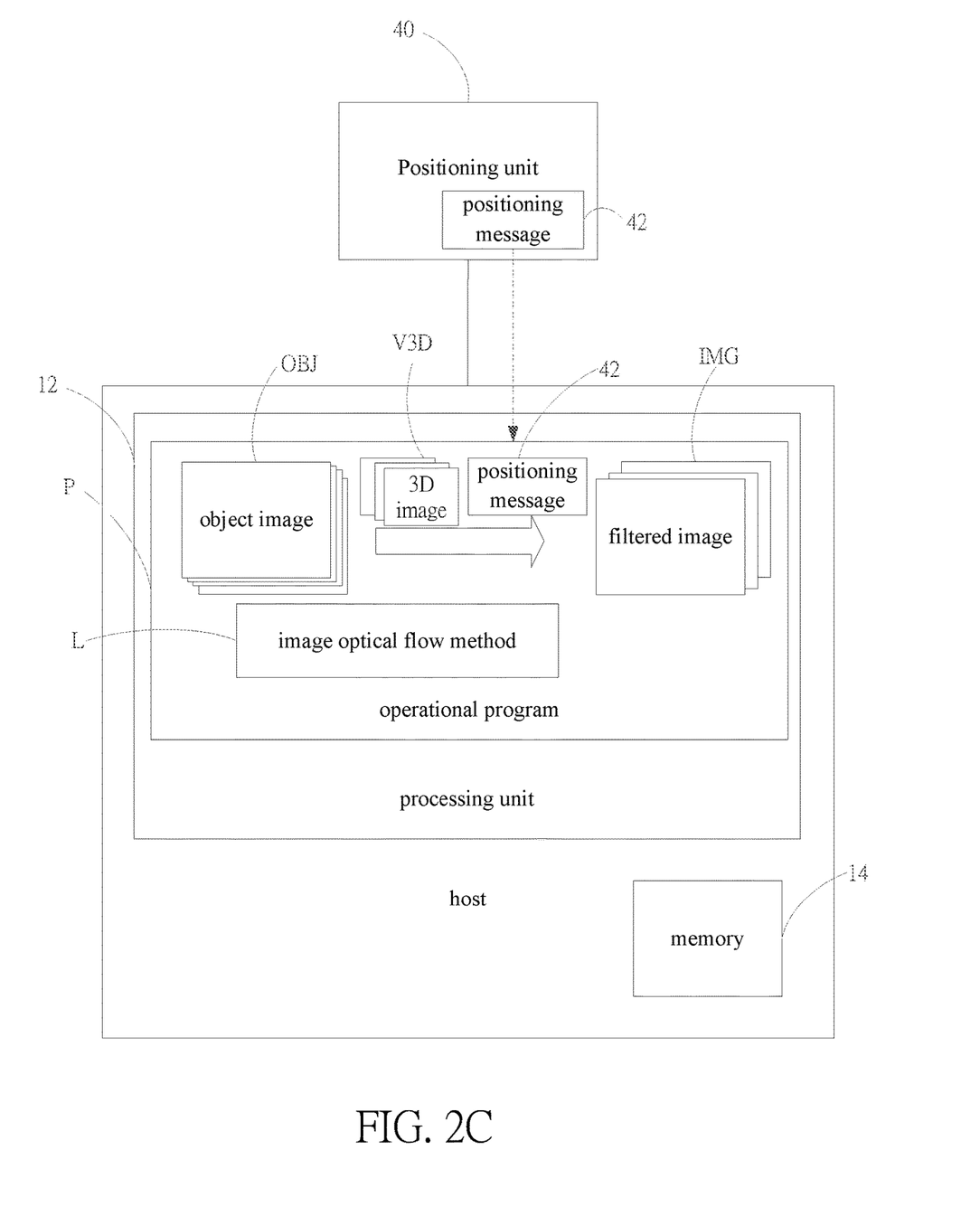

Next, in the step S16, as shown in FIG. 2C, the processing unit 12 executes an image optical flow method L for filtering the object images OBJ and giving the filtered images IMG. In other words, the processing unit 12 filters the corresponding objects according the first moving route L1 of the mobile carrier V and acquiring the corresponding filtered images IMG. For example, if the object is an roadside object or car, the processing unit 12 will not take its corresponding object image OBJ into consideration and the corresponding object image OBJ will not be labeled as one of the filtered images. As shown in FIG. 2B, the object VO includes the first object VO1 and the second object VO2. The second object VO2 is a roadside car and hence will not influence the first moving route L1 of the mobile carrier V. Thereby, the object image OBJ of the second object VO2 will not be labeled as a filtered image IMG. That is to say, the object image OBJ of the first object VO1 will be filtered and become a filtered image IMG. The processing unit 12 according to the present embodiment executes the operational program P to extract a three-dimensional (3D) image V3D of the first object VO1 and performs spatial identification according to the three-dimensional image V3D. Namely, the host 10 performs spatial identification according to the three-dimensional image V3D and uses the positioning message 42 provided by the positioning unit 40 to confirm that the second object VO2 is a parked car and not moved. In addition, the first object VO1 according to the present embodiment is the person taking the mobile carrier V. Nonetheless, the present application is not limited to the embodiment. Alternatively, the first object VO1 can be a moving car.

Figure 2D:
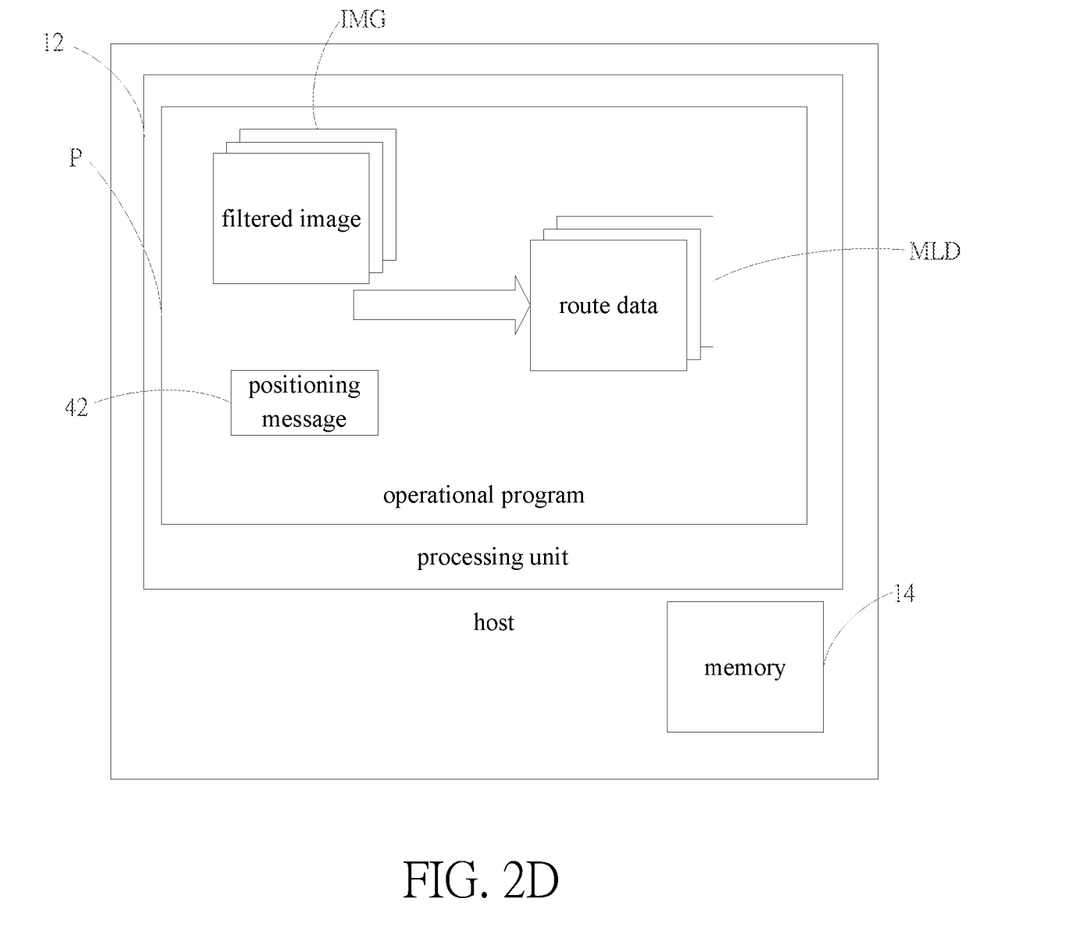

In the step S18, please refer to FIG. 2B and FIG. 2D, the host 10 executes the operational program P and performs a prediction operation according to the filtered images IMG for predicting the predicted route ML corresponding to the first object VO1 of the filtered images IMG. The processing unit 12 performs the prediction operation according to the positioning message 42 and the corresponding object vectors of the filtered images IMG to give the corresponding route data MLD of the filtered images IMG. The route data MLD correspond to the predicted route ML shown in FIG. 2B. The corresponding object vectors of the filtered images IMG can be a zero vector, representing a stationary object influencing the first moving route L1.

Figure 2E:
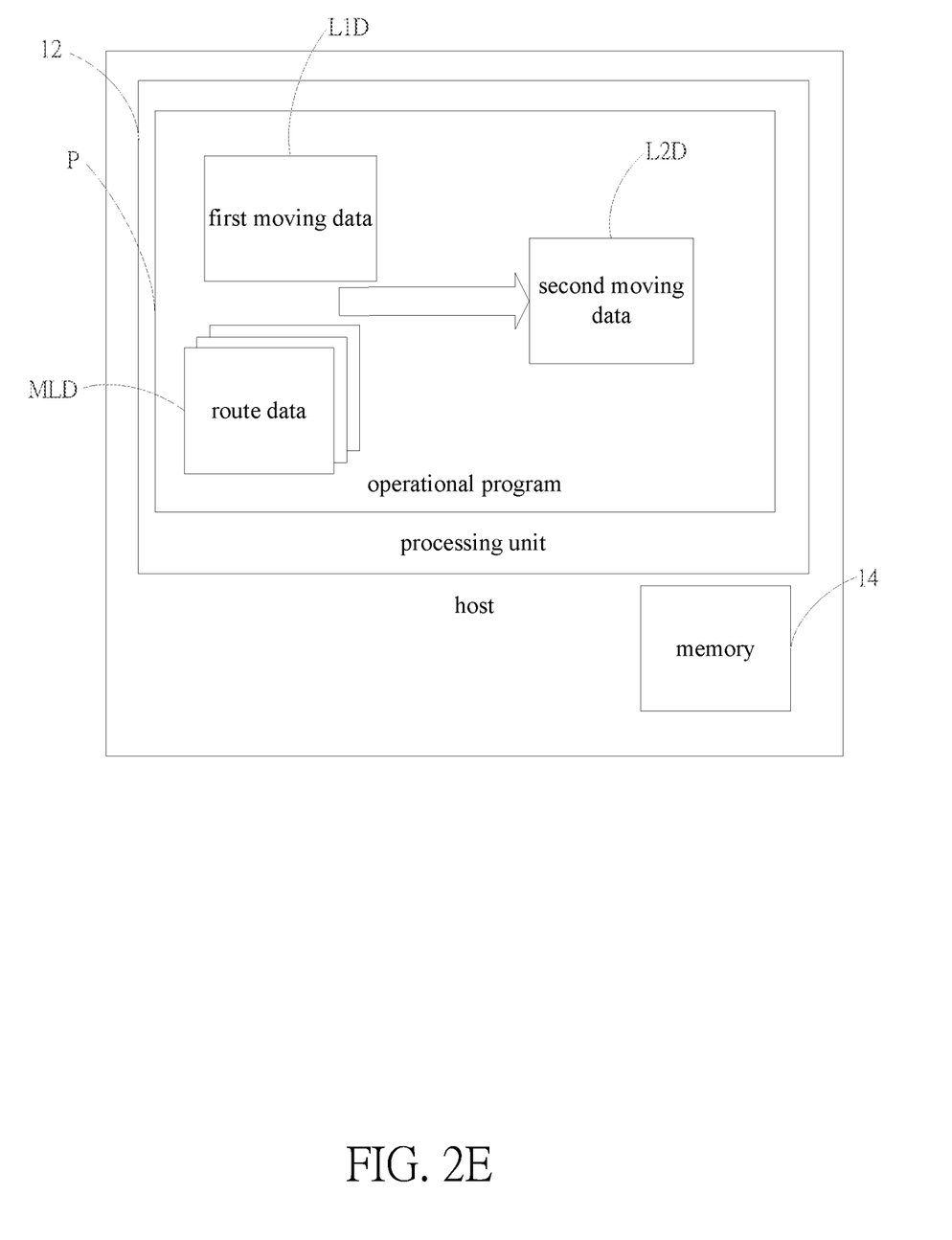
Figure 2F:
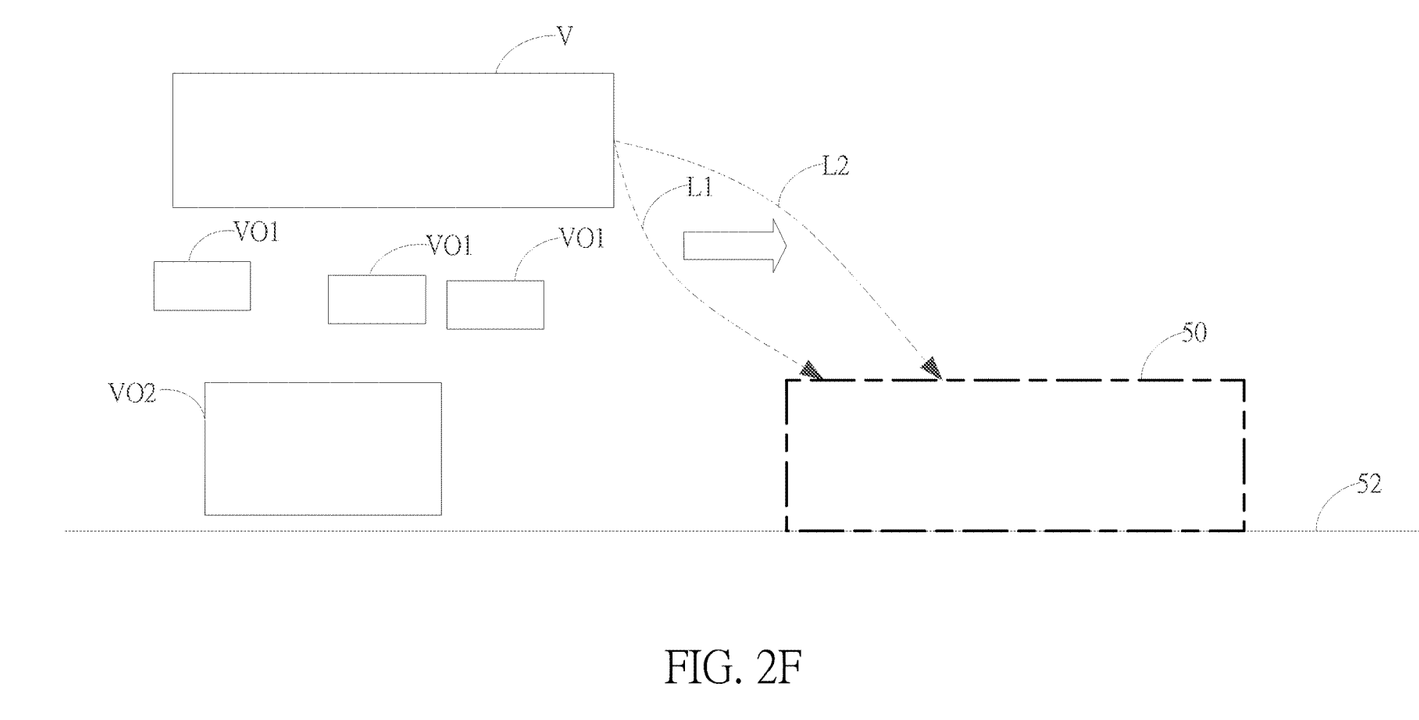

In the step S20, please refer to FIG. 2B and FIG. 2E, the host 10 executes the operational program P and refers to the first moving route L1 of the mobile carrier V to give first moving data L1D, for example, the turning angle and the radius difference between inner wheels. The first moving data L1D is calculated with the route data MLD given in the step S18 to generate a second moving route L2. The host 10 will adjust the first moving data L1D according to the route data MLD and hence adjusting the first moving route L1 of the mobile carrier V for further generating second moving data L2D of the second moving route L2, for example, delaying moving, changing the inserting angle of the mobile carrier V into the parking space 50, or changing the parking space 50. In addition to displaying on a display unit (not shown in the figures) for notifying the driver of the mobile carrier V with the dangerous situation at the blind spot on one side of the mobile carrier V, the second moving route L2 generated by the host 10 according to the present application can be further applied to the ADAS for intervening drivers' the driving behaviors for avoiding danger.

The equations for calculating the radius difference between inner wheels include:

$$a = \sqrt{R^2 - L^2} - \frac{d_2}{2} \tag{1}$$

$$\cos\alpha = \frac{a + \frac{d_2}{2}}{R} \tag{2}$$

$$b = \sqrt{R^2 + \left(\frac{d_2}{2}\right) - d_1 R \cos\alpha} \tag{3}$$

$$m = b - a \tag{4}$$

R is the turning radius of the mobile carrier V; L is the wheelbase; $d_1$ is the distance between front wheels; $d_2$ is the distance between rear wheels; $\alpha$ is the angle between the midpoint of the front and rear axles of the mobile carrier V and the center of the turning circle; a is the moving radius of the central line of the inner rear wheel; b is the moving radius of the central line of the inner front wheel; and m is the radius difference of inner wheel of a non-trailer carrier.

Figure 3:
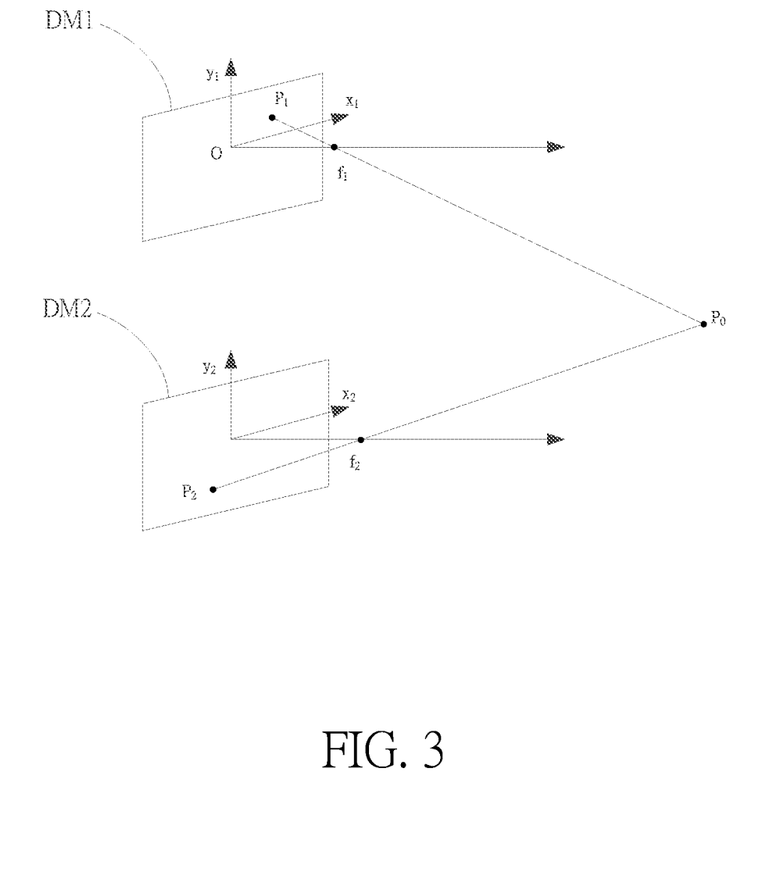
FIG. 3 shows a schematic diagram of perspective projection method according to an embodiment of the present application.

As shown in FIG. 3, by using the perspective projection method, the image point $P_0$ extracted by the image extraction unit 30 includes a first image point $P_1$ and a second image point $P_2$. The coordinates (x, y) of the first image point $P_1$ are located in the first domain DM1; the coordinates (x', y') of the second image point $P_2$ are located in the second domain DM2. Thereby, the relation between the first image point $P_1$ and the second image point $P_2$ extracted by the image extraction unit 30 can be expressed by the following equations:

$$x' = \frac{m_0 x + m_1 y + m_2}{m_6 x + m_7 y + 1} \tag{5}$$

$$y' = \frac{m_3 x + m_4 y + m_5}{m_6 x + m_7 y + 1} \tag{6}$$

(x,y) is the first image point $P_1$; (x', y') is the second image point $P_2$; $m_0, m_1, \ldots m_7$ are the parameters relevant to the image extraction unit 30, including the focal length, the turning angle, and sizing parameters. The image points can be expanded to a plurality of image point pairs. Then the Levenberg-Marquardt algorithm can be used to perform nonlinear minimization and giving the optimum values of $m_1$ to $m_7$, which is used as the optimum focal length for the image extraction unit 30.

The above image optical flow method L adopts the Lucas-Kanade optical flow algorithm for estimating obstacles. The image difference method is used first. Then the image constraint equation is expanded by the Taylor equation:

$$I(x + \delta x, y + \delta y, z + \delta z, t + \delta t) = \tag{7}$$

$$I(x, y, z, t) + \frac{\partial I}{\partial x}\delta x + \frac{\partial I}{\partial y}\delta y + \frac{\partial I}{\partial z}\delta z + \frac{\partial I}{\partial t}\delta t + H.O.T.$$

where H.O.T. means higher order terms in the equation and can be neglected for infinitesimal displacement. According to the equation, we can get:

$$\frac{\partial I}{\partial x}\delta x + \frac{\partial I}{\partial y}\delta y + \frac{\partial I}{\partial z}\delta z + \frac{\partial I}{\partial t}\delta t = 0 \text{ or} \tag{8}$$

$$\frac{\partial I}{\partial x}\frac{\delta x}{\delta t} + \frac{\partial I}{\partial y}\frac{\delta y}{\delta t} + \frac{\partial I}{\partial z}\frac{\delta z}{\delta t} + \frac{\partial I}{\partial t}\frac{\delta t}{\delta t} = 0 \tag{9}$$

and giving:

$$\frac{\partial I}{\partial x}V_x + \frac{\partial I}{\partial y}V_y + \frac{\partial I}{\partial z}V_z + \frac{\partial I}{\partial t} = 0 \tag{10}$$

$V_x$, $V_y$, $V_z$ are formed by x, y, z in the optical flow vector I(x,y,z,t).

$$\frac{\partial I}{\partial x}, \frac{\partial I}{\partial y}, \frac{\partial I}{\partial z}, \text{ and } \frac{\partial I}{\partial t}$$

are the partial derivatives of the image with respective to the corresponding directions at the point (x,y,z,t). Thereby, equation (10) can be converted to the following equation:

$$I_x V_x + I_y V_y + I_z V_z = -I_t \tag{11}$$

Rewriting equation (11) as:

$$\nabla I^T \cdot \vec{V} = -I_t \tag{12}$$

Since equation (10) contains three unknowns (Vx,Vy,Vz), the subsequent algorithm can solve for the unknowns.

First, assume that the optical flow vector ($V_x$, $V_y$, $V_z$) is constant in a small m*m*m (m>1) cube. Then, according to the voxel 1 . . . n, n=$m^3$, the following equation set will be given:

$$I_{x_1}V_x + I_{y_1}V_y + I_{z_1}V_z = -I_{t_1} \tag{13}$$

-continued $$I_{x_2}V_x + I_{y2}V_y + I_{z_2}V_z = -I_{t_2}$$

$$\vdots$$

$$I_{x_n}V_x + I_{yn}V_y + I_{z_n}V_z = -I_{t_n}$$

The above equation contain three unknowns and form an overdetermined equation set, meaning there is redundancy therein. The equation set can be represented as:

$$\begin{bmatrix} I_{x1} & I_{y1} & I_{z1} \\ I_{x2} & I_{y2} & I_{z2} \\ \vdots & \vdots & \vdots \\ I_{x_n} & I_{yn} & I_{z_n} \end{bmatrix} \begin{bmatrix} V_x \\ V_y \\ V_z \end{bmatrix} = \begin{bmatrix} -I_{t_1} \\ -I_{t_2} \\ \vdots \\ -I_{t_n} \end{bmatrix} \quad (14)$$

Denote (14) as:

$$A\vec{v} = -b \quad (15)$$

To solve this overdetermined problem, equation (15) adopts the least square method to give:

$$A^T A \vec{v} = A^T(-b) \quad (16)$$

$$\vec{v} = (A^T A)^{-1} A^T(-b) \quad (17)$$

We can get:

$$\begin{bmatrix} V_x \\ V_y \\ V_z \end{bmatrix} = \begin{bmatrix} \sum I_{x_i}^2 & \sum I_{x_i} I_{y_i} & \sum I_{x_i} I_{z_i} \\ \sum I_{x_i} I_{y_i} & \sum I_{y_i}^2 & \sum I_{y_i} I_{z_i} \\ \sum I_{x_i} I_{z_i} & \sum I_{y_i} I_{z_i} & \sum I_{z_i}^2 \end{bmatrix}^{-1} \begin{bmatrix} -\sum I_{x_i} I_{t_i} \\ -\sum I_{y_i} I_{t_i} \\ -\sum I_{z_i} I_{t_i} \end{bmatrix} \quad (18)$$

Substituting the result of equation (18) into equation (10) for estimating acceleration vector information and distance information of one or more objects. Thereby, the one or more objects can be classified and their route can be predicted. For example, the object image OBJ of the first object VO1 is classified as a filtered image IMG, and the predicted route ML of the first object VO1 is predicted.

Figure 4:
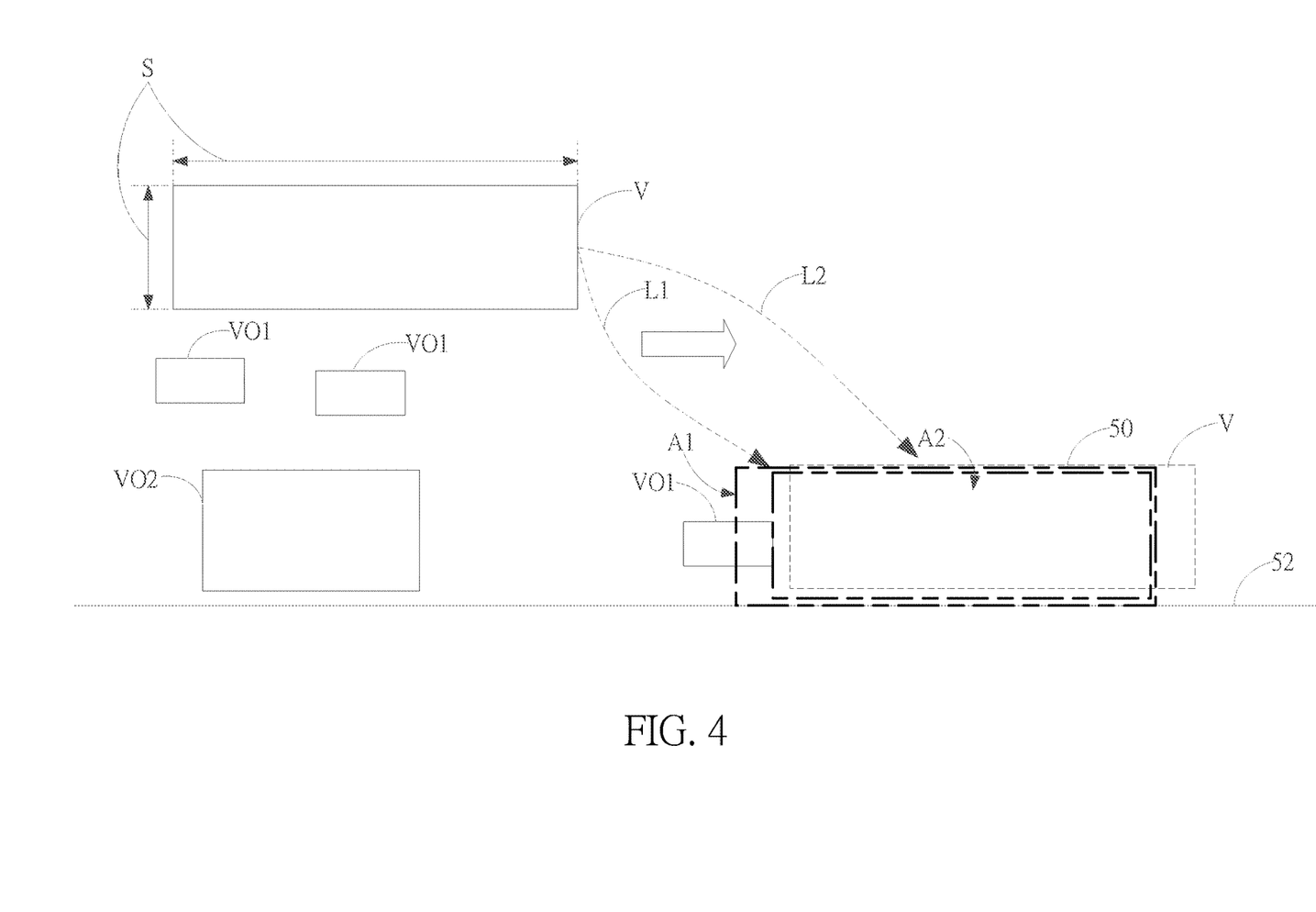
FIG. 4 shows a schematic diagram of parking in a portion of the parking space according to an embodiment of the present application.
Figure 5:
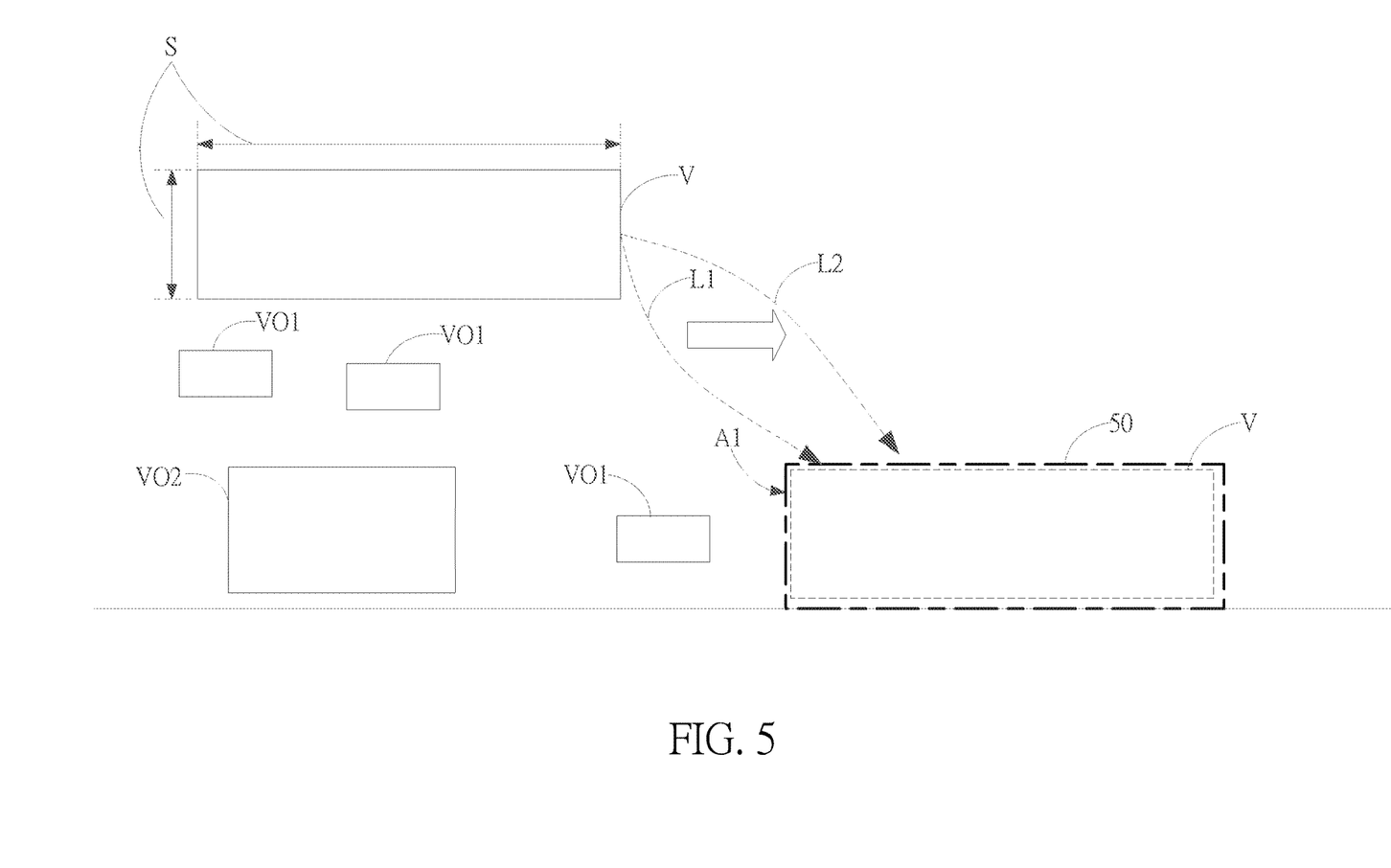
FIG. 5 shows a schematic diagram of parking in a parking space according to an embodiment of the present application.

In addition, as shown in FIG. 4, the host can further get a first effective area A1 of the parking space 50 and a carrier size S, namely, the visual length and width, of the mobile carrier V. In the step S20, the processing unit 12 of the host 10 can judge if the first effective area A1 is shrunk to a second effective area A2. The first effective area A1 is greater than the carrier size S; the second effective area A2 is smaller than the carrier size S. When the processing unit 12 of the host 10 judges that the first effective area A1 is shrunk to a second effective area A2, the processing unit 12 adjusts the second moving data L2D so that the second moving route L2 guides the mobile carrier V to park to a portion of the parking space 50. For example, one of the first objects VO1 is located on a side edge of the parking space 50 and shrinking the effective area of the parking space 50 to 80% and smaller than the carrier size S. A portion of the mobile carrier V is located on or even exceeding the edge of the parking space 50. As shown in FIG. 5, when the processing unit 12 judges that the effective area of the parking space 50 is not changed, the processing unit 12 maintains the second moving data L2D and the second moving route L2 guides the mobile carrier V to parking into the parking space.

To sum up, the present application provides a system for sensing and responding to a lateral blind spot of a mobile carrier and the method thereof. The host acquires the object images of a plurality of objects on one side of a mobile carrier for classifying and giving filtered images. Then prediction calculations are performed on the corresponding objects of the filtered images to give predicted route. The predicted route is calculated with the moving route of the mobile carrier to give a second moving route. Besides, the host can further adjust the moving data according to the route data for avoiding dangerous situations.

The invention claimed is:

1. A method for sensing and responding to a lateral blind spot of a mobile carrier, the mobile carrier comprising a host, a light scanner, and an image extraction unit, said host connected electrically to said light scanner and said image extraction unit, and said method comprising the following steps of:

said host executing a parking command indicated of said host generating a positioning message according to a relative location or an absolute location of said mobile carrier with respective to a parking space located at one side of said mobile carrier;

said host acquiring a first moving route indicated of said mobile carrier parking to said parking space according to said positioning message and a location message of said parking space;

said host adopting said light scanner scanning the one or more objects located at and corresponding to the parking space, and said host adopting said image extraction unit extracting one or more object images corresponding to said one or more objects, and said one or more objects corresponding to a lateral blind spot of said mobile carrier;

said host filtering said one or more object images using an image optical flow method according to first moving route and giving the corresponding one or more object images as one or more filtered images according to said first moving route;

said host generating one or more predicted routes according to the corresponding one or more object vectors of said one or more filtered images; and said host modifying said first moving route according to said one or more predicted routes and generating a second moving route correspondingly;

wherein in said step of said host modifying said first moving route according to said one or more predicted routes and generates a second moving route correspondingly, said host judges if a first effective area of said parking space is shrunk to a second effective area according to said one or more predicted routes, said first effective area is greater than a carrier size of said mobile carrier, said second effective area is smaller than said carrier size, and when said first effective area is shrunk to said second effective area, said second moving route is indicated of said mobile carrier parking to a portion of said parking space.

2. The method for sensing and responding to a lateral blind spot of a mobile carrier of claim 1, where in said step in which said light scanner scans one or more objects at said parking space according to said first moving route and said image extraction unit extracts one or more object images correspondingly, said light scanner further scans said one or more objects surrounding said parking space and said image extraction unit extracts t said corresponding one or more object images surrounding said parking space.

3. The method for sensing and responding to a lateral blind spot of a mobile carrier of claim 1, where in said step in which said host adopts an image optical flow method to classify said one or more object images, said host extracts a plurality of three-dimensional images according to said one or more filtered images and classifies said one or more object images using said image optical flow method according to said positioning message.

4. The method for sensing and responding to a lateral blind spot of a mobile carrier of claim 1, where in said step in which said host modifies said first moving route according to said one or more predicted routes and generates a second moving route correspondingly, said host calculates according to a corresponding radius difference between inner wheels and a turning angle of said first moving route and said one or more predicted path routes and then modifies said first moving route and generates said second moving route correspondingly.

5. A system for sensing and responding to a lateral blind spot of a mobile carrier comprising:
 a host, disposed in said mobile carrier, executing a parking command according to a parking space located at one side of said mobile carrier while said host generating a positioning message according to a relative location or an absolute location of said mobile carrier with respective to said parking space, and said host acquiring a first moving route indicated of said mobile carrier parking to said parking space according to said positioning message and a corresponding location message of said parking space;
 a light scanner, disposed on said side of said mobile carrier, scanning one or more objects located at and corresponding to said parking space according to said first moving route, and said one or more objects corresponding to a lateral blind spot of said mobile carrier; and
 an image extraction unit, disposed on said side of said mobile carrier and adjacent to said light scanner, connected electrically to said host, and extracting one or more object images corresponding to said one or more objects;
 where said host executes an image optical flow method according to said first moving route for filtering said one or more object images and giving one or more filtered images according to said first moving route; said host generates one or more predicted routes according to one or more object vectors of said one or more filtered images; and said host modifies said first moving route according to said one or more predicted routes and generates a second moving route correspondingly, said host judges if a first effective area of the parking space is shrunk to a second effective area according to said one or more predicted routes, said first effective area is greater than a carrier size of said mobile carrier, said second effective area is smaller than said carrier size, and when said first effective area is shrunk to said second effective area, said second moving route is indicated of said mobile carrier parking to a portion of said parking space.

6. A system for sensing and responding to a lateral blind spot of a mobile carrier system of claim 5, wherein said light scanner is a lidar or a radar scanner.

7. A system for sensing and responding to a lateral blind spot of a mobile carrier of claim 5, wherein said host calculates according to a corresponding radius difference between inner wheels and a turning angle of said first moving route and said one or more predicted routes and then modifies said first moving route and generates said second moving route correspondingly.

8. A system for sensing and responding to a lateral blind spot of a mobile carrier of claim 5, wherein a location of the lateral blind spot is a blind spot region corresponding to said parking space of said mobile carrier and defined by the intelligent transport system ISO 17387.

* * * * *